UNITED STATES PATENT OFFICE.

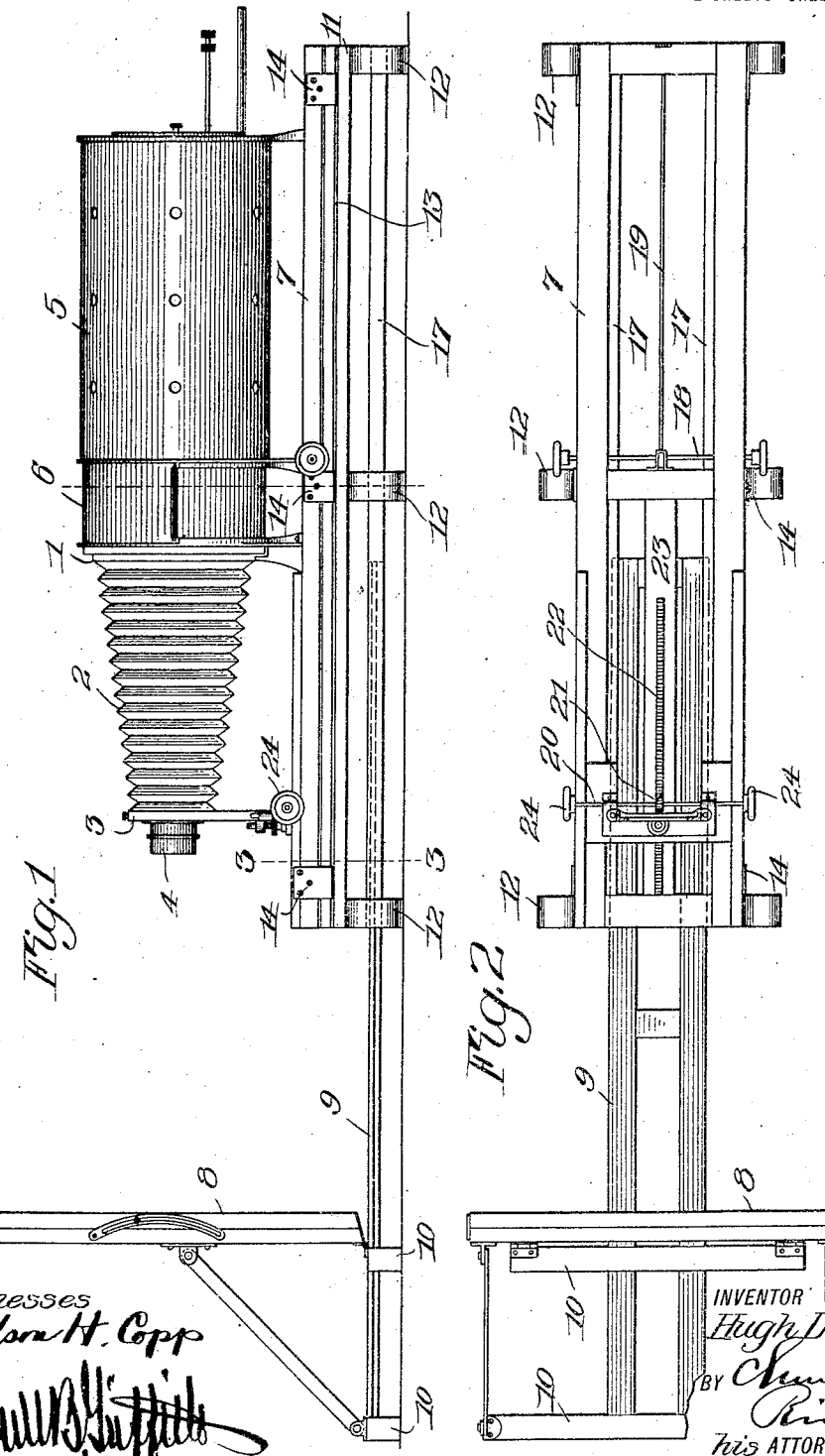

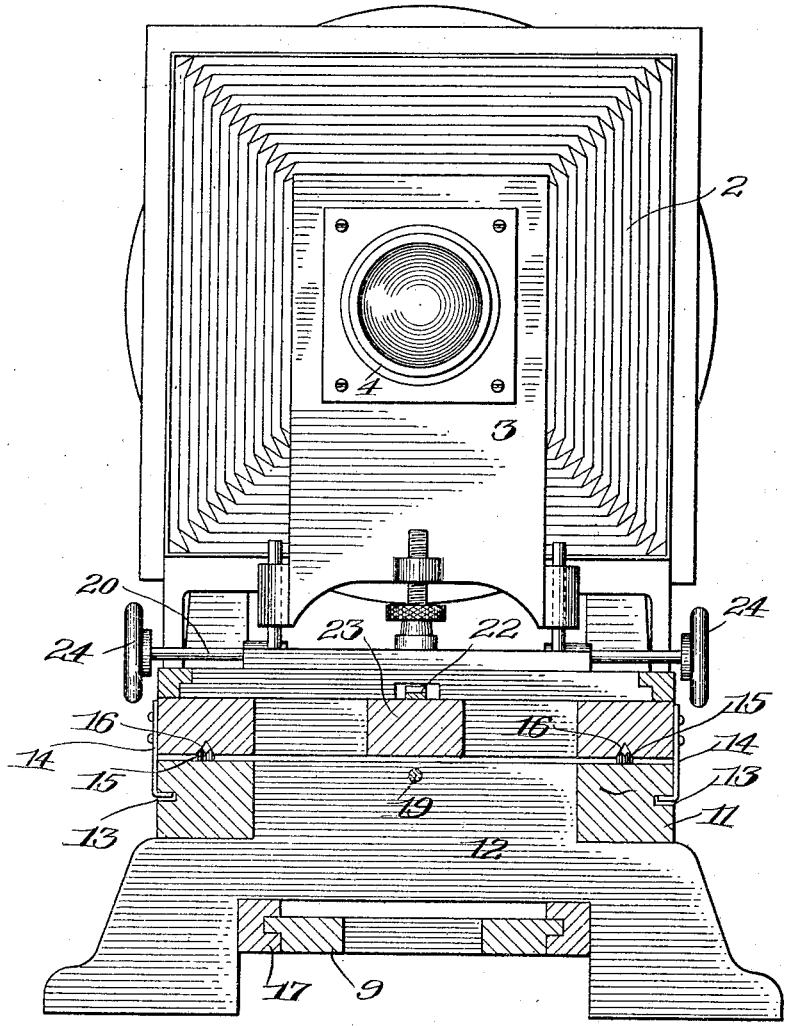

HUGH DAVIS, OF ROCHESTER, NEW YORK, ASSIGNOR TO EASTMAN KODAK COMPANY, OF ROCHESTER, NEW YORK, A CORPORATION OF NEW YORK.

ENLARGING-CAMERA.

1,297,329.  Specification of Letters Patent.  Patented Mar. 18, 1919.

Application filed November 27, 1916. Serial No. 133,528.

*To all whom it may concern:*

Be it known that I, HUGH DAVIS, of Rochester, in the county of Monroe and State of New York, have invented certain new and useful Improvements in Enlarging-Cameras; and I do hereby declare the following to be a full, clear, and exact description of the same, reference being had to the accompanying drawings, forming a part of this specification, and to the reference-numerals marked thereon.

My present invention relates to photography and more particularly to enlarging cameras by means of which the image of a negative is projected by the camera upon a copyholder or easel upon which the sensitive medium is placed, the apparatus also embodying a lamp located in rear of the camera to provide the required amount of light, and my invention has for its object to provide a simple, compact and self-contained apparatus in which all of these elements will be arranged in such relationship as to be convenient and accessible for relative adjustment in the operation of enlarging. To these and other ends the invention resides in certain improvements and combinations of parts all as will be hereinafter more fully described, the novel features being pointed out in the claim at the end of the specification.

In the drawings:

Figure 1 is a side elevation of an enlarging camera constructed in accordance with and illustrating one embodiment of my invention;

Fig. 2 is a top plan view of the supporting frames of the apparatus with the camera and lamp house removed, and Fig. 3 is an enlarged sectional view taken transversely of the apparatus substantially on the line 3—3 of Fig. 1;

Similar reference numerals throughout the several views indicate the same parts.

Aside from its focusing mechanism, I have not illustrated any details of the projector or camera proper as its precise construction constitutes no part of the present invention. As shown, it comprises generally a body frame 1, bellows 2, front 3 with lens tube 4 and a lamp house 5 at the rear. Between the lamp house and body frame, in which latter the negative is placed, is a chamber 6 for the condensing lenses and ground glass. All of these parts are mounted upon a common frame 7 by means of which they may be moved together and without changing their relative positions toward and from a vertically disposed copyholder or easel 8 with which the camera is in alinement. This copyholder or easel is also movable toward and from the camera by means of an extension frame 9 by which it is carried. Sagging of the frame may be prevented by providing cross rails 10 that rest upon the supporting surface when the copyholder is unusually heavy.

The main supporting frame or base for the apparatus is indicated at 11 and it rests upon transverse leg blocks 12. The frame has grooves 13 at the sides with which engage flanged side plates 14 on the camera supporting frame 7 to hold the latter in coöperation with the main frame which has mounted therein rollers 15 (Fig. 3) engaging grooves 16 in the frame 7 to reduce friction in moving the rather heavily loaded upper frame about. The extension frame 9 for the copyholder is preferably mounted beneath the main frame 11 to run in guides 17 secured to the leg blocks 12, as shown in Fig. 3. This frame is moved back and forth by hand as is the frame 7 but the latter is preferably provided with a suitable clamping device 18 coöperating with a rod 19 on the base to hold the projecting apparatus in adjusted position.

The front 3 of the camera is made to move independently of the other parts on the bed 7 and for this purpose has journaled therein a shaft 20 provided with a pinion 21 that coöperates with a rack 22 on a rail 23 extending centrally of the frame 7. The shaft is turned by means of knobs 24 at either side projecting or retracting the lens 4 as required for focusing.

With an apparatus of the character described, it will be seen that the operator may make all of his adjustments from one position at the side of the base or main frame 11 and regulate the degree of enlargement, the focus and the light intensity with the greatest convenience while the machine is relatively light and compact and takes up little room in the studio. The extension frame 9 is thrust in under the base frame when not in use and the length of the base frame need be only that of the projector. By moving the frame 7 in one direction and the frame 9 in the other, the camera lens and copyholder may nevertheless be separated a considerable distance.

I claim as my invention:

In an enlarging camera, the combination with a main frame or base having a plurality of supporting legs, of a rigid extension support, supported by and adjustable on the legs beneath the main frame, and above a supporting surface on which the legs rest and carrying a copyholder, a carriage on top of the base movable in alinement with the copyholder and adapted to be projected beyond the base in one direction while the extension support is similarly projected in the other direction, and a projecting camera and lamp house therefor mounted on the carriage, said camera embodying a focusing front independently adjustable on the carriage.

HUGH DAVIS.

Witnesses:
 MARGARET DUIGNAN,
 HELEN M. FRASER.

Copies of this patent may be obtained for five cents each, by addressing the "Commissioner of Patents, Washington, D. C."